United States Patent
Xiang et al.

(10) Patent No.: US 10,965,585 B2
(45) Date of Patent: Mar. 30, 2021

(54) METHOD FOR TRANSMITTING PATH LOAD INFORMATION AND NETWORK NODE

(71) Applicant: HUAWEI TECHNOLOGIES CO., LTD., Guangdong (CN)

(72) Inventors: Haizhou Xiang, Beijing (CN); Nongda Hu, Beijing (CN); Boyan Tu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 16/239,855

(22) Filed: Jan. 4, 2019

(65) Prior Publication Data

US 2019/0140936 A1   May 9, 2019

Related U.S. Application Data

(63) Continuation of application No. PCT/CN2017/077019, filed on Mar. 17, 2017.

(30) Foreign Application Priority Data

Jul. 6, 2016   (CN) .......................... 201610527684.X (51) Int. Cl.
*H04L 12/729*   (2013.01)
*H04L 12/801*   (2013.01)
(Continued)

(52) U.S. Cl.
CPC ........ *H04L 45/125* (2013.01); *H04L 43/0894* (2013.01); *H04L 43/16* (2013.01);
(Continued)

(58) Field of Classification Search
CPC ... H04L 45/125; H04L 45/24; H04L 43/0894; H04L 43/16; H04L 47/11; H04L 47/125
See application file for complete search history.

(56) References Cited

U.S. PATENT DOCUMENTS 6,768,718 B1 *   7/2004   Beshai .................... H04L 45/00
                                                                370/237
7,808,896 B2 *   10/2010  Haas ..................... H04L 45/125
                                                                370/230
(Continued)

FOREIGN PATENT DOCUMENTS

CN   103001884 A   3/2013
CN   103023781 A   4/2013
(Continued)

OTHER PUBLICATIONS

Eiji Oki et al, Load-Balanced IP Routing Scheme Based on Shortest Paths in Hose Model. IEEE Transactions on Communications, vol. 58, No. 7, Jul. 2010, 9 pages.
(Continued)

*Primary Examiner* — Patrice L Winder
(74) *Attorney, Agent, or Firm* — Fish & Richardson P.C.

(57) ABSTRACT

This application provides a method for transmitting path load information and a network node. The method includes: obtaining, by the network node, M pieces of path load information; aggregating, by the network node into one load metric based on the M pieces of path load information, load of all shortest paths that are from the network node to the destination node and that pass through M adjacent nodes corresponding to the M pieces of path load information, where the load metric indicates total load of all the shortest paths from the network node to the destination node; and sending, by the network node, information about the load metric to another adjacent node other than the M adjacent nodes of all adjacent nodes of the network node.

10 Claims, 3 Drawing Sheets

A network node obtains M pieces of path load information, where an $i^{th}$ piece of path load information of the M pieces of path load information is used to indicate total load of all shortest paths that are from the network node to a destination node and that pass through an $i^{th}$ adjacent node of M adjacent nodes of the network node, and $M \geq i \geq 1$ — S210

The network node aggregates, into one load metric based on the M pieces of path load information, load of all shortest paths that are from the network node to the destination node and that pass through each of the M adjacent nodes, where the load metric is used to indicate total load of all the shortest paths from the network node to the destination node — S220

The network node sends information about the load metric to another adjacent node — S230

(51) Int. Cl.
*H04L 12/803* (2013.01)
*H04L 12/707* (2013.01)
*H04L 12/26* (2006.01)

(52) U.S. Cl.
CPC .............. *H04L 45/24* (2013.01); *H04L 47/11* (2013.01); *H04L 47/125* (2013.01)

(56) References Cited

U.S. PATENT DOCUMENTS

| | | | |
|---|---|---|---|
| 8,077,718 B2* | 12/2011 | Mortier ................. | H04L 41/042 370/392 |
| 8,095,645 B2* | 1/2012 | Ninan ................. | H04L 43/0882 709/223 |
| 8,223,634 B2* | 7/2012 | Tanaka ................ | H04L 12/4641 370/229 |
| 8,547,850 B2* | 10/2013 | Matsubara .............. | H04L 45/38 370/232 |
| 8,891,379 B2* | 11/2014 | Ninan ..................... | H04L 43/00 370/237 |
| 9,954,766 B2* | 4/2018 | Shimizu ................. | H04L 45/48 |
| 10,009,260 B2* | 6/2018 | Hampel ................ | H04L 45/245 |
| 10,454,830 B2* | 10/2019 | Xu ........................ | H04L 47/125 |
| 2014/0064082 A1 | 3/2014 | Yeung et al. | |
| 2015/0032871 A1* | 1/2015 | Allan .................... | H04L 47/125 709/223 |
| 2015/0109934 A1 | 4/2015 | Harshavardha | |
| 2015/0127797 A1* | 5/2015 | Attar ..................... | H04L 47/125 709/223 |
| 2016/0182353 A1 | 6/2016 | Garcia-Luna-Aceves et al. | |
| 2019/0245803 A1* | 8/2019 | Hu ...................... | H04L 43/0882 |

FOREIGN PATENT DOCUMENTS

| | | |
|---|---|---|
| CN | 105721311 A | 6/2016 |
| EP | 2541850 A1 | 1/2013 |
| JP | 2006295265 A | 10/2006 |

OTHER PUBLICATIONS

International Search Report and Written Opinion issued in International Application No. PCT/CN2017/077019 dated May 31, 2017, 16 pages.
Mohammad Alizadeh et al. CONGA: Distributed Congestion-Aware Load Balancing for Datacenters, SIGCOMM '14, Aug. 17-22, 2014. pp. 503-514. XP58053862A.
Extended European Search Report issued in European Application No. 17823432.4 dated Mar. 22, 2019, 8 pages.

* cited by examiner

METHOD FOR TRANSMITTING PATH LOAD INFORMATION AND NETWORK NODE

CROSS-REFERENCE TO RELATED APPLICATIONS

This application is a continuation of International Application No. PCT/CN2017/077019, filed on Mar. 17, 2017, which claims priority to Chinese Patent Application No. 201610527684.X, filed on Jul. 6, 2016, The disclosures of the aforementioned applications are hereby incorporated by reference in their entireties.

TECHNICAL FIELD

This application relates to the communications field, and in particular, to a method for transmitting path load information and a network node.

BACKGROUND

On a communications network, such as the Internet Protocol (Internet Protocol, IP), there may be one or more paths for transmitting data from one network node (which may be referred to as a source node) to another network node (which may be referred to as a destination node). Usually, the network node chooses a single path or an equal-cost multipath (ECMP) to transmit a packet.

However, the path selected by the source node may be in a congested state due to excessive load, resulting in a packet loss. Therefore, the source node needs to obtain path load information, and selects a packet transmission path based on the path load information, so as to select a path with lighter load to transmit a packet.

The source node obtains the path load information by using a feedback of a node on a path. For example, on a 2-tier (2-tier) data center network, the source node may obtain path load information by using a "forward path congestion measurement and backward congestion feedback" method. A specific manner is: Each time data sent by the source node to the destination node passes through a forwarding node on a path, the forwarding node updates the packet with congestion information of an interface that is of the forwarding node and that is used for forwarding the packet from the source node to the destination node, and sends the updated packet to a next-hop forwarding node, until the packet arrives at the destination node. In other words, when the packet arrives at the destination node, the packet carries the load information of the path from the source node to the destination node. Then, the destination node adds the path load information to a backhaul packet from the destination node to the source node, and feeds back the path load information to the source node.

After obtaining the path load information, the source node needs to store the path load information for selecting a path. However, the path load information is fed back based on a quantity of pathsin the prior art. In other words, an amount of path load information that the source node obtains and needs to store is positively correlated with a quantity of paths from the source node to the destination node.

With development of a network, there are a huge quantity of paths from the source node to the destination node on the network. If the foregoing method is used, there is a large amount of path load information that the source node needs to store. As a result, the source node needs to increase a capacity of an entry for storing the path load information.

SUMMARY

This application provides a method for transmitting path load information and a network node, to reduce a requirement for a capacity of an entry used by the network node to store path load information.

According to a first aspect, this application provides a method for transmitting path load information by a network node. The method includes: obtaining, by the network node, M pieces of path load information, where an $i^{th}$ piece of path load information of the M pieces of path load information is used to indicate total load of all shortest paths, passing through an $i^{th}$ adjacent node of the network node, among all shortest paths from the network node to a destination node, and M≥i≥1; aggregating, by the network node into one load metric based on the M pieces of path load information, load of all shortest paths that are from the network node to the destination node and that pass through M adjacent nodes corresponding to the M pieces of path load information, where the load metric is used to indicate total load of all the shortest paths from the network node to the destination node; and sending, by the network node, information about the load metric to another adjacent node other than the M adjacent nodes of all adjacent nodes of the network node.

In this embodiment of this application, the network node first obtains the load information of all the shortest paths that are from the network node to the destination node and that pass through the M adjacent nodes, among all the adjacent nodes, having shortest paths to the target node, and then aggregates the load information, that is, only one load metric is needed to indicate load information of all the shortest paths from the network node to the destination node; and sends the aggregated load information to the another adjacent node other than the M adjacent nodes of all the adjacent nodes of the network node. Therefore, path load information stored on the network node does not depend on a quantity of paths from the network node to the destination node, and the network node needs to store only aggregated path load information of the shortest paths from the network node to the destination node. This reduces a requirement for a capacity of an entry used by the network node to store path load information.

In a possible implementation, the aggregating, by the network node into one load metric based on the M pieces of path load information, load of all shortest paths that are from the network node to the destination node and that pass through M adjacent nodes corresponding to the M pieces of path load information includes: aggregating, by the network node into one load metric based on the M pieces of path load information and M load coefficients, the load of all the shortest paths that are from the network node to the destination node and that pass through the M adjacent nodes, where an $i^{th}$ load coefficient of the M load coefficients is a total bandwidth of all interfaces that are used by the network node to send data to the $i^{th}$ adjacent node.

In a possible implementation, the aggregating, by the network node into one load metric based on the M pieces of path load information and M load coefficients, the load of all the shortest paths that are from the network node to the destination node and that pass through the M adjacent nodes includes: obtaining, by the network node, a load metric U according to a formula $$U = a_0 + b_0 \frac{\sum_{i=1}^{M}(B_i U_i)}{\sum_{i=1}^{M} B_i},$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

In a possible implementation, the aggregating, by the network node into one load metric based on the M pieces of path load information, the load of all the shortest paths that are from the network node to the destination node and that pass through the M adjacent nodes corresponding to the M pieces of path load information includes: obtaining, by the network node, a load metric U according to a formula $$U = a_0 + b_0 \sum_{i=1}^{M}(B_i U_i),$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

In a possible implementation, the sending, by the network node, information about the load metric to another adjacent node other than the M adjacent nodes of all adjacent nodes of the network node includes: periodically sending, by the network node, the information about the load metric to the another adjacent node.

In this embodiment of this application, the network node periodically reports the information about the load metric to the another adjacent node of the network node, so that the load metric information on the adjacent node can be updated in real time, and the another network node can select a path based on the load metric information updated in real time, thereby avoiding path congestion in time.

In a possible implementation, the sending, by the network node, information about the load metric to another adjacent node other than the M adjacent nodes of all adjacent nodes of the network node includes: adding, by the network node, the information about the load metric to a packet that is to be forwarded by the network node to the another adjacent node, and sending, to the another adjacent node, the packet to which the information has been added.

In this embodiment of this application, the network node adds the information about the load metric to the packet that is to be forwarded by the network node to the another network node, to reduce bandwidth consumption.

In a possible implementation, the sending, by the network node, information about the load metric to another adjacent node other than the M adjacent nodes of all adjacent nodes of the network node includes: sending, by the network node, the information about the load metric to the another adjacent node when the load metric exceeds a load threshold.

In this embodiment of this application, when the aggregated path load metric exceeds a preset threshold, the network node reports the information about the load metric to the another network node in time, so that the another network node can select a path based on the load metric in real time, thereby avoiding path congestion.

According to a second aspect, this application provides a network node, where the network node includes a module configured to perform the method in the first aspect.

According to a third aspect, this application provides a network node, including a receiver, a transmitter, a processor, and a memory, where the memory is used to store code, the processor is configured to execute the code in the memory, and the receiver and the transmitter are configured to communicate with another device. When the code is executed, the processor invokes the receiver and the transmitter to implement the method in the first aspect.

According to a fourth aspect, this application provides a computer-readable medium, where the computer-readable medium stores program code executed by a network node, and the program code includes an instruction for performing the method in the first aspect.

DESCRIPTION OF EMBODIMENTS

For ease of understanding, an overall description is provided for an example diagram of a system architecture that can implement the method in the embodiments of this application. An apparatus in FIG. 1 may be hardware, functional software, or a combination thereof.

Figure 1:
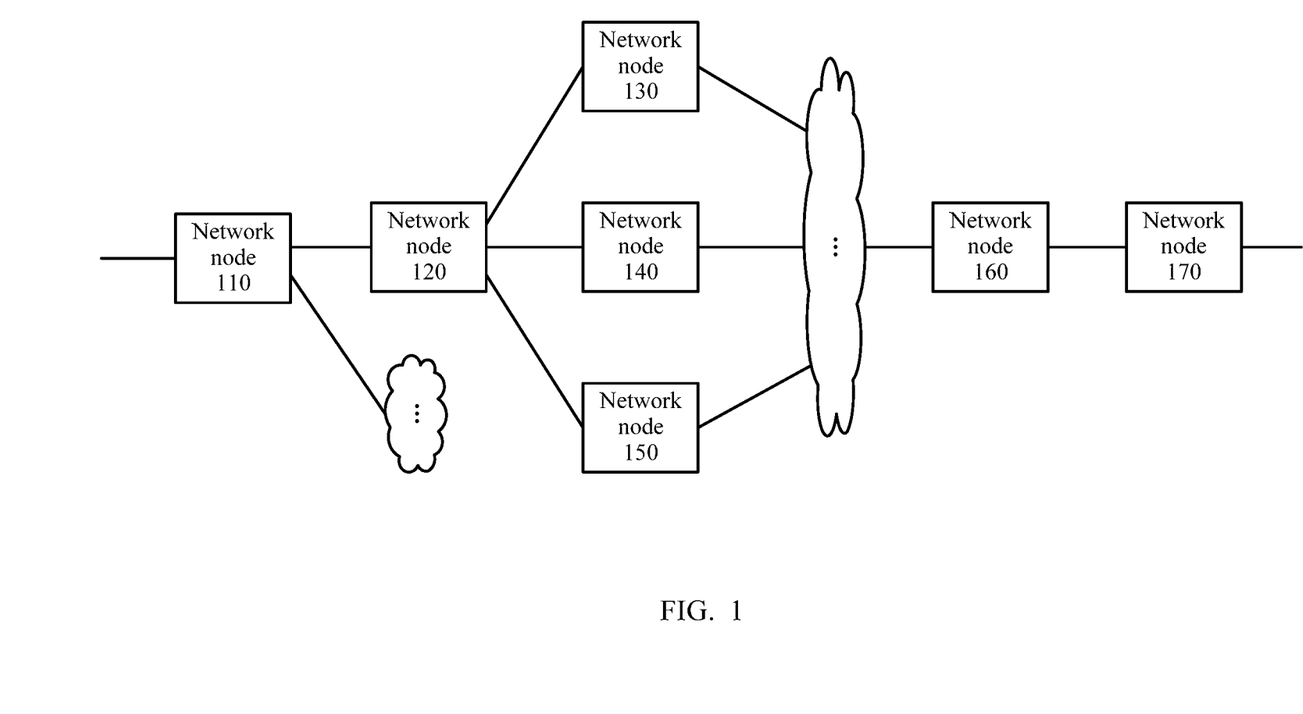
FIG. 1 is a schematic structural diagram of a network to which a method of an embodiment of this application is applied.

As shown in FIG. 1, a network node 110 may communicate with a network node 170 by using network nodes such as a network node 120, a network node 130, a network node 140, a network node 150, and a network node 160. Usually, the network node 110 and the network node 170 are edge nodes on a network.

When the network node 110 (which may be referred to as a source node) needs to transmit a packet to the network node 170 (which may be referred to as a destination node), the network node 110 may transmit the packet by using one or more of a plurality of paths from the network node 110 to the network node 170. On the network, the network node 110 and the network node 120 are nodes adjacent to each other. In other words, the network node 110 is an adjacent node of the network node 120, and the network node 120 is also an adjacent node of the network node 110. In addition to the network node 110, adjacent nodes of the network node 120 include the network node 130, the network node 140, and the network node 150. The network node 160 and the network node 170 are nodes adjacent to each other.

It should be understood that the embodiments of this application are not limited to the system architecture shown in FIG. 1. For example, ellipses in FIG. 1 indicate that the network to which the method for transmitting path load information in the embodiments of this application can be applied may further include more source nodes and destination nodes. More or fewer paths may exist between network nodes.

Figure 2:
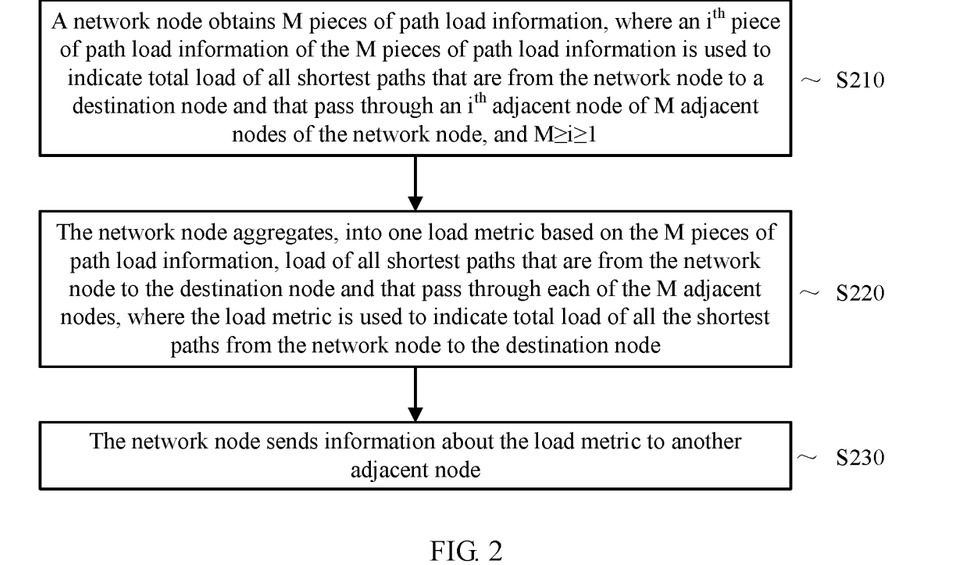
FIG. 2 is a schematic flowchart of a method for transmitting path load information by a network node according to an embodiment of this application.

The following describes a method for transmitting path load information by a network node according to an embodiment of this application with reference to FIG. 2. It should be understood that FIG. 2 shows steps or operations of the method for transmitting path load information by the network node, but these steps or operations are only used as examples. In the embodiments of this application, variations of the operations in FIG. 2 or other operations may also be performed. In addition, the steps in FIG. 2 may be performed in an order different from that shown in FIG. 2, and possibly not all of the operations in FIG. 2 need to be performed.

S210. A network node obtains M pieces of path load information, where an $i^{th}$ piece of path load information of the M pieces of path load information is used to indicate total load of all shortest paths, passing through an $i^{th}$ adjacent node of the network node, among all shortest paths from the network node to a destination node, and M≥i≥1.

The shortest path in this embodiment of this application is a shortest path in a routing protocol. There are a variety of methods for identifying a shortest path in the prior art, and therefore details are not described herein. There may be a plurality of shortest paths from the network node to the destination node, and the plurality of shortest paths may pass through a same adjacent node of the network node, or may pass through different adjacent nodes.

If all paths that are from the network node to the destination node and that pass through M adjacent nodes of all adjacent nodes of the network node include shortest paths, the $i^{th}$ piece of path load information of the M pieces of path load information is used to indicate a load metric obtained by aggregating load of all the shortest paths that are from the network node to the destination node and that pass through the $i^{th}$ adjacent node of the M adjacent nodes.

As shown in FIG. 1, if all paths that are from a network node 120 to a network node 170 and that pass through a network node 130, a network node 140, and a network node 150 include shortest paths from the network node 120 to the network node 170, the network node 120 may obtain three pieces of path load information. A first piece of path load information indicates total load of all shortest paths that are from the network node 120 to the network node 170 and that pass through the network node 130. A second piece of path load information indicates total load of all shortest paths that are from the network node 120 to the network node 170 and that pass through the network node 140. A third piece of path load information indicates total load of all shortest paths that are from the network node 120 to the network node 170 and that pass through the network node 150.

Path load may be measured in a plurality of ways. A first way to measure path load is to measure an occupied rate of an interface of the network node. In other words, the path load is measured based on a proportion of a used bandwidth of the interface of the network node. For example, assuming that a total bandwidth of all interfaces that are used by the network node to send data to an adjacent node of the network node is 100 M (megabytes), and a bandwidth of 80 M in the bandwidth of 100 M has been used to send data, load of a path from the network node to the adjacent node of the network node may be measured as 80 M/100 M, that is, 0.8.

A second way to measure path load is to measure an occupied bandwidth of an interface of the network node. In other words, the path load is measured based on the occupied bandwidth of the interface of the network node. For example, assuming that a total bandwidth of all interfaces that are used by the network node to send data to an adjacent node of the network node is 100 M, and a bandwidth of 80 M in the bandwidth of 100 M has been used to send data, load of a path from the network node to the adjacent node of the network node may be measured as 80 M.

A third way to measure path load is to measure an unoccupied rate of an interface of the network node. In other words, the path load is measured based on a proportion of an unused bandwidth of the interface of the network node. For example, assuming that a total bandwidth of all interfaces that are used by the network node to send data to an adjacent node of the network node is 100 M, a bandwidth of 80 M in the bandwidth of 100 M has been used to send data, and a remaining bandwidth of 20 M has not been used, load of a path from the network node to the adjacent node of the network node may be measured as 20 M/100 M, that is, 0.2.

A fourth way to measure path load is to measure an unoccupied bandwidth of an interface of the network node. In other words, the path load is measured based on a remaining bandwidth of the interface of the network node. For example, assuming that a total bandwidth of all interfaces that are used by the network node to send data to an adjacent node of the network node is 100 M, a bandwidth of 80 M in the bandwidth of 100 M has been used to send data, and a remaining bandwidth of 20 M has not been used, load of a path from the network node to the adjacent node of the network node may be measured as 20 M.

S220. The network node aggregates, into one load metric based on the M pieces of path load information, load of all shortest paths that are from the network node to the destination node and that pass through M adjacent nodes corresponding to the M pieces of path load information, where the load metric is used to indicate total load of all the shortest paths from the network node to the destination node.

The network node 120 shown in FIG. 1 may aggregate, into one load metric that indicates total load of all the shortest paths from the network node 120 to the network node 170, the total load of all the shortest paths that are from the network node 120 to the network node 170 and that pass through the network node 130, the total load of all the shortest paths that are from the network node 120 to the network node 170 and that pass through the network node 140, and the total load of all the shortest paths that are from the network node 120 to the network node 170 and that pass through the network node 150. In other words, the total load of all the shortest paths from the network node 120 to the network node 170 can be indicated by using only one load metric.

Therefore, the network node 120 does not need to separately store the load information of all the shortest paths that are from the network node 120 to the network node 170 and that pass through the network node 130, the network node 140, and the network node 150, and only needs to store one load metric that can indicate load information of all the shortest paths from the network node 120 to the network node 170. This reduces a requirement for a capacity of an entry used by the network node 120 to store path load information.

S230. The network node sends information about the load metric to another adjacent node other than the M adjacent nodes of all adjacent nodes of the network node.

The network node 120 shown in FIG. 1 sends, to a network node 110, the aggregated load metric from the network node 120 to the network node 170, so that the network node 110 selects a path based on information about the load metric.

Therefore, the network node 110 only needs to store a load metric, sent by another adjacent node such as the network node 120, obtained by aggregating load information of all shortest paths from the another adjacent node to the network node 170, and does not need to store path load information of all shortest paths from the network node 110 to the network node 170.

In this embodiment of this application, load information of a plurality of paths from the network node to the destination node may be aggregated into one load metric, and then the load metric is sent to another network node. Therefore, the method in this embodiment of this application can also reduce a network bandwidth occupation rate.

Optionally, in an embodiment, the aggregating, by the network node into one load metric based on the M pieces of path load information, load of all shortest paths that are from the network node to the destination node and that pass through M adjacent nodes corresponding to the M pieces of path load information includes: aggregating, by the network node into one load metric based on the M pieces of path load information and M load coefficients, the load of all the shortest paths that are from the network node to the destination node and that pass through the M adjacent nodes, where an $i^{th}$ load coefficient of the M load coefficients indicates a total bandwidth of all interfaces that are used by the network node to send data to the $i^{th}$ adjacent node.

Optionally, all or some of the M load coefficients may be preset fixed values. If a load coefficient is a fixed value, it indicates that impact of a total bandwidth of all interfaces that are used by the network node to send data to an adjacent node corresponding to the load coefficient exerted on the aggregated load metric is ignored.

Optionally, in an embodiment, the aggregating, by the network node into one load metric based on the M pieces of path load information and M load coefficients, the load of all the shortest paths that are from the network node to the destination node and that pass through the M adjacent nodes includes: obtaining, by the network node, a load metric U according to a formula $$U = a_0 + b_0 \frac{\sum_{i=1}^{M}(B_i U_i)}{\sum_{i=1}^{M} B_i},$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

$a_0$ and $b_0$ may be preset parameters. When $a_0=0$ and $b_0=1$ hold true, it indicates that the aggregated load metric completely depends on the M pieces of path load information and the M load coefficients.

Optionally, in an embodiment, the aggregating, by the network node into one load metric based on the M pieces of path load information, the load of all the shortest paths that are from the network node to the destination node and that pass through the M adjacent nodes includes: obtaining, by the network node, a load metric U according to a formula $$U = a_0 + b_0 \sum_{i=1}^{M}(B_i U_i),$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

$B_i$ may be a fixed value, and it indicates that impact of a bandwidth of an interface on the aggregated load information is ignored. For example, $B_i$ may be 1, that is, $$U = a_0 + b_0 \sum_{i=1}^{M} U_i.$$

When $a_0=0$ and $b_0=1$ hold true, it indicates that the aggregated load metric completely depends on the M pieces of path load information.

Optionally, in an embodiment, the sending, by the network node, information about the load metric to another adjacent node other than the M adjacent nodes of all adjacent nodes of the network node includes: periodically sending, by the network node, the information about the load metric to the another adjacent node.

In this embodiment of this application, the network node periodically reports the information about the load metric to the another adjacent node of the network node, so that the load metric information on the another network node can be updated in real time, and the another node can select a path based on the load metric information updated in real time, thereby avoiding path congestion in time.

Optionally, in an embodiment, the sending, by the network node, information about the load metric to another adjacent node other than the M adjacent nodes of all adjacent nodes of the network node includes: adding, by the network node, the information about the load metric to a packet that is to be forwarded by the network node to the another adjacent node, and sending, to the another adjacent node, the packet to which the information has been added.

In this embodiment of this application, when the network node needs to send a data packet to another network node, the network node may add the information about the load metric to the packet, to reduce bandwidth consumption.

Optionally, in an embodiment, the sending, by the network node, information about the load metric to another adjacent node other than the M adjacent nodes of all adjacent nodes of the network node includes: sending, by the network node, the information about the load metric to the another adjacent node when the load metric exceeds a load threshold.

In this embodiment of this application, when the aggregated path load metric exceeds a preset threshold, the network node reports the information about the load metric to the another network node in time, so that the another network node can select a path based on the load metric, thereby avoiding path congestion.

In this embodiment of this application, the network node may separately aggregate load information of paths from the network node to different destination nodes, and then sends a plurality of pieces of aggregated load information to the another network node together.

The following describes a possible specific implementation of the method for transmitting path load information by the network node according to this embodiment of this application with reference to FIG. 1 and FIG. 2.

The network node 160 first determines load of an interface through which the network node 160 sends data to the network node 170. It may be assumed that the network node 160 sends the data to the network node 170 through N interfaces, where N≥1. Load of each interface may be indicated by an integer. If three bits (bit) may be used to indicate the load of each interface, a load metric of each interface ranges from 0 to 7.

The load metric of the interface may be positively or negatively correlated with an occupation rate of the interface. When the load metric of the interface is positively correlated with the occupation rate of the interface, the load metric indicates a congestion status, that is, a congestion level, of the interface. When the load metric of the interface is negatively correlated with the occupation rate of the interface, the load metric indicates a proportion of a remaining bandwidth of the interface.

After determining load of the N interfaces through which the network node 160 sends data to the network node 170, the network node 160 aggregates the load. Total load obtained through aggregation is load of a path from the network node 160 to the network node 170.

One way to obtain the load of the path from the network node 160 to the network node 170 is to perform weighted averaging on the load of the N interfaces. A specific calculation manner may be $$U_1 = a_1 + b_1 \frac{\sum_{i=1}^{N}(B_i U_i)}{\sum_{i=1}^{N} B_i},$$

where $U_1$ is the load of the path from the network node 160 to the network node 170, $a_1$ is any number, $b_1$ is a non-zero number, $U_i$ is load of an $i^{th}$ interface of the N interfaces, $B_i$ is a bandwidth coefficient of the $i^{th}$ interface of the N interfaces, and this bandwidth coefficient may be a bandwidth of the interface or a fixed value. If the bandwidth coefficient is a fixed value, it indicates that impact of the bandwidth of the interface is ignored.

Another way to obtain the load of the path from the network node 160 to the network node 170 is to perform weighted accumulation on the load of the interfaces through which the network node 160 sends data to the network node 170. A specific calculation manner may be $$U_1 = a_1 + b_1 \sum_{i=1}^{N}(B_i U_i),$$

where $U_1$ is the load of the path from the network node 160 to the network node 170, $a_1$ is any number, $b_1$ is a non-zero number, $U_i$ is load of an $i^{th}$ interface of the N interfaces, $B_i$ is a bandwidth coefficient of the $i^{th}$ interface of the N interfaces, and this bandwidth coefficient may be a bandwidth of the interface or a fixed value. If the bandwidth coefficient is a fixed value, it indicates that impact of the bandwidth of the interface is ignored.

After aggregating the load of the N interfaces into one piece of load, the network node 160 sends, to another adjacent network node, the load as the load of the path from the network node 160 to the network node 170. The network node 160 may periodically send information about the load to the another adjacent node, or may add information about the load to a packet passing through the network node 160, or may directly send information about the load to the another adjacent node when the load is greater than a preset threshold.

For brevity, a process for transmitting path load information by the network nodes indicated by the ellipses in FIG. 1 is omitted herein.

The network node 130 obtains load of all shortest paths from the network node 130 to the network node 170; may aggregate the load of these shortest paths into one load metric according to the method shown in FIG. 2; and sends information about the load metric to the network node 120. The network node 140 obtains load of all shortest paths from the network node 140 to the network node 170; may aggregate the load of these shortest paths into one load metric according to the method shown in FIG. 2; and sends information about the load metric to the network node 120. The network node 150 obtains load of all shortest paths from the network node 150 to the network node 170; may aggregate the load of these shortest paths into one load metric according to the method shown in FIG. 2; and sends information about the load metric to the network node 120.

After obtaining the load metric of all the shortest paths from the network node 130 to the network node 170, the network node 120 may aggregate the load metric with load of a path from the network node 120 to the network node 130, to obtain the total load of all the shortest paths that are from the network node 120 to the network node 170 and that pass through the network node 130. The network node 120 may obtain, by using a same method, the total load of all the shortest paths that are from the network node 120 to the network node 170 and that separately pass through the network node 140 and the network node 150.

A possible implementation of aggregating, by the network node 120, the load metric of all the shortest paths from the network node 130 to the network node 170 with the load of the path from the network node 120 to the network node 130 is: The network node 120 uses, as the total load of all the shortest paths that are from the network node 120 to the network node 170 and that pass through the network node 130, a smaller value of the load metric of all the shortest paths from the network node 130 to the network node 170 and the load of the path from the network node 120 to the network node 130.

After the network node 120 obtains the total load of all the shortest paths that are from the network node 120 to the network node 170 and that pass through the network node 130, the total load of all the shortest paths that are from the network node 120 to the network node 170 and that pass through the network node 140, and the total load of all the shortest paths that are from the network node 120 to the network node 170 and that pass through the network node 150, the network node 120 aggregates the total load of all the shortest paths that are from the network node 120 to the network node 170 and that pass through the network node 130, the network node 140, and the network node 150, to obtain the total load of all the shortest paths from the network node 120 to the network node 170. For a specific aggregation manner, refer to the method shown in FIG. 2. Details are not described herein again.

After obtaining, through aggregation, the total load of all the shortest paths from the network node 120 to the network node 170, the network node 120 sends information about the total load to the network node 110. The network node 120 may periodically send the information about the total load to the network node 110, or may add the information about the total load to a packet that is to be sent to the network node 110 through the network node 120, or may directly send the information about the total load to the network node 110 when the total load is greater than a preset threshold.

After receiving the information about the total load of all the shortest paths from the network node 120 to the network node 170 that is sent by the network node 120, the network node 110 may aggregate the total load with load of a path from the network node 110 to the network node 120, to obtain total load of all shortest paths that are from the network node 110 to the network node 170 and that pass through the network node 120.

The network node 110 may further obtain and store information about total load of all shortest paths that are from the network node 110 to the network node 170 and that pass through another adjacent node other than the network node 120. In this case, a quantity of load information, of shortest paths from the network node 110 to the network node 170, that the network node 110 needs to store is related to a quantity of adjacent nodes that are among adjacent nodes of the network node 110 and that are on the shortest paths from the network node 110 to the network node 170. If the network node 110 may send data to the network node 170 through T adjacent nodes and all the T adjacent nodes are on the shortest paths, the network node 110 may store only T pieces of path load information. One of the T pieces of path load information is information about total load of all shortest paths that are from the network node 110 to the network node 170 and that pass through one of the T adjacent nodes and a network node between the adjacent node and the network node 170.

When the network node 110 needs to send a packet to the network node 170, the network node 110 chooses, based on the T pieces of path load information stored on the network node 110, one or more paths to send the packet. It is assumed that the network node 110 chooses, based on the T pieces of path load information, to send the packet to the network node 170 through the network node 120. When the packet arrives at the network node 120, the network node 120 selects a packet path based on load information, stored on the network node 120, of the paths that are from the network node 120 to the network node 170 and that separately pass through the network node 130, the network node 140, and the network node 150.

Usually, the network node may send data to the destination node through a plurality of adjacent nodes of the network node, and it is possible that lengths of paths that are from the network node to the destination node and that pass through different adjacent nodes are different, and lengths of a plurality of paths that are from the network node to the destination node and that pass through a same adjacent node are different. Therefore, in this embodiment of this application, optionally, the $i^{th}$ piece of path load information of the M pieces of path load information may be used to indicate the total load of all paths that are from the network node to the destination node and that pass through the $i^{th}$ adjacent node. In this case, the network node aggregates, into one load metric based on the M pieces of path load information, the load of all paths that are from the network node to the destination node and that pass through the M adjacent nodes corresponding to the M pieces of path load information, where the load metric is used to indicate the total load of all paths from the network node to the destination node. Then, the network node sends the information about the load metric to another adjacent node other than the M adjacent nodes of all the adjacent nodes of the network node.

The foregoing describes the method for transmitting path load information by the network node in this embodiment of this application. The following describes the network node in the embodiments of this application with reference to FIG. 3 and FIG. 4.

Figure 3:
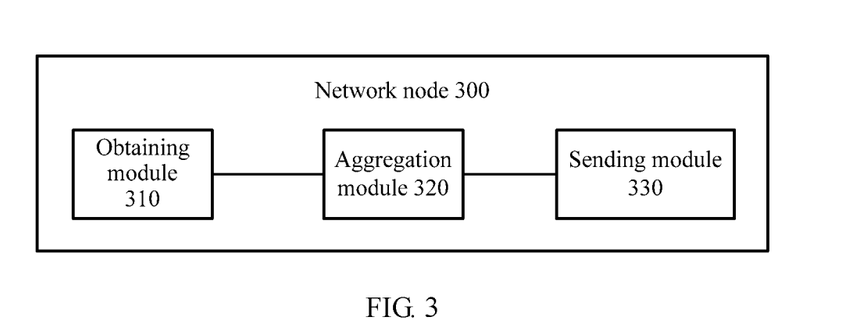
FIG. 3 is a schematic structural diagram of a network node according to an embodiment of this application.

FIG. 3 is a schematic structural diagram of a network node 300 according to an embodiment of this application. It should be understood that the network node 300 shown in FIG. 3 is merely an example. The network node in this embodiment of this application may further include another module or unit, include modules with functions similar to those of various modules in FIG. 3, or unnecessarily include all modules in FIG. 3.

An obtaining module 310 is configured to obtain M pieces of path load information, where an $i^{th}$ piece of path load information of the M pieces of path load information is used to indicate total load of all shortest paths, passing through an $i^{th}$ adjacent node of the network node, among all shortest paths from the network node to a destination node, and M≥i≥1.

An aggregation module 320 is configured to aggregate, into one load metric based on the M pieces of path load information, load of all shortest paths that are from the network node to the destination node and that pass through M adjacent nodes corresponding to the M pieces of path load information, where the load metric is used to indicate total load of all the shortest paths from the network node to the destination node.

A sending module 330 is configured to send information about the load metric to another adjacent node other than the M adjacent nodes of all adjacent nodes of the network node.

In this embodiment of this application, the network node first obtains the load information of all the shortest paths that are from the network node to the destination node and that pass through the M adjacent nodes, among all the adjacent nodes, having shortest paths to the target node, and then aggregates the load information, that is, only one load metric is needed to indicate load information of all the shortest paths from the network node to the destination node; and sends the aggregated load information to the adjacent node other than the M adjacent nodes of all the adjacent nodes of the network node. Therefore, path load information stored on the network node does not depend on a quantity of paths from the network node to the destination node, and the network node needs to store only aggregated path load information of the shortest paths from the network node to the destination node. This reduces a requirement for a capacity of an entry used by the network node to store path load information.

Optionally, in an embodiment, the aggregation module 320 may be specifically configured to aggregate, into one load metric based on the M pieces of path load information and M load coefficients, the load of all the shortest paths that are from the network node to the destination node and that pass through the M adjacent nodes, where an $i^{th}$ load coefficient of the M load coefficients is a total bandwidth of all interfaces that are used by the network node to send data to the $i^{th}$ adjacent node.

Optionally, in an embodiment, the aggregation module 320 may be specifically configured to obtain a load metric U according to a formula $$U = a_0 + b_0 \frac{\sum_{i=1}^{M}(B_i U_i)}{\sum_{i=1}^{M} B_i},$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

Optionally, in an embodiment, the aggregation module 320 may be specifically configured to obtain a load metric U according to a formula $$U = a_0 + b_0 \sum_{i=1}^{M}(B_i U_i),$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

Optionally, $B_i$ may be a fixed value. For example, $B_i$ may be 1.

Optionally, in an embodiment, the sending module 330 may be specifically configured to: periodically send the information about the load metric to the another adjacent node; or add the information about the load metric to a packet that is to be forwarded by the network node to the another adjacent node, and send, to the another adjacent node, the packet to which the information has been added; or send the information about the load metric to the another adjacent node when the load metric exceeds a load threshold.

Figure 4:
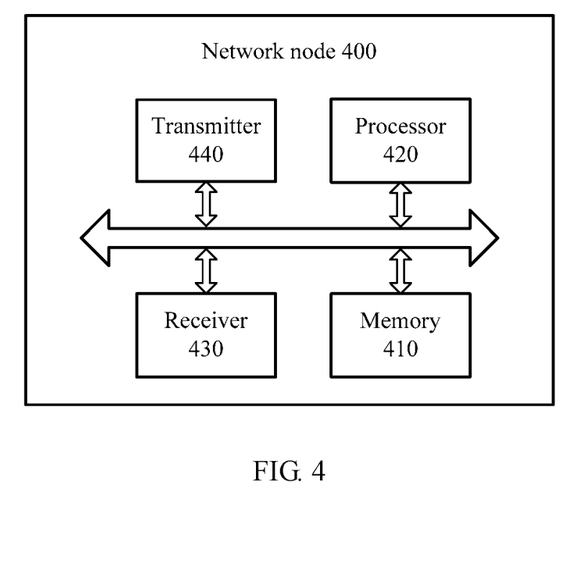
FIG. 4 is a schematic structural diagram of a network node according to an embodiment of this application.

FIG. 4 is a schematic structural diagram of a network node 400 according to an embodiment of this application. The network node 400 includes a memory 410, a processor 420, a receiver 430, and a transmitter 440.

The memory 410 is configured to store a program.

The processor 420 is configured to execute the program stored in the memory 410. When the processor 420 executes the program in the memory 410, the processor 420 is specifically configured to obtain M pieces of path load information, where an $i^{th}$ piece of path load information of the M pieces of path load information is used to indicate total load of all shortest paths, passing through an $i^{th}$ adjacent node of the network node, among all shortest paths from the network node to a destination node, and M≥i≥1.

The processor 420 is further configured to aggregate, into one load metric based on the M pieces of path load information, load of all shortest paths that are from the network node to the destination node and that pass through M adjacent nodes corresponding to the M pieces of path load information, where the load metric is used to indicate total load of all the shortest paths from the network node to the destination node.

The receiver 430 is configured to receive a message from another network node.

The transmitter 440 is configured to send information about the load metric to another adjacent node other than the M adjacent nodes of all adjacent nodes of the network node.

In this embodiment of this application, the network node first obtains the load information of all the shortest paths that are from the network node to the destination node and that pass through the M adjacent nodes, among all the adjacent nodes, having shortest paths to the target node, and then aggregates the load information, that is, only one load metric is needed to indicate load information of all the shortest paths from the network node to the destination node; and sends the aggregated load information to the adjacent node other than the M adjacent nodes of all the adjacent nodes of the network node. Therefore, path load information stored on the network node does not depend on a quantity of paths from the network node to the destination node, and the network node needs to store only aggregated path load information of the shortest paths from the network node to the destination node. This reduces a requirement for a capacity of an entry used by the network node to store path load information.

Optionally, in an embodiment, the processor 420 may be specifically configured to aggregate, into one load metric based on the M pieces of path load information and M load coefficients, the load of all the shortest paths that are from the network node to the destination node and that pass through the M adjacent nodes, where an $i^{th}$ load coefficient of the M load coefficients is a total bandwidth of all interfaces that are used by the network node to send data to the $i^{th}$ adjacent node.

Optionally, in an embodiment, the processor 420 may be specifically configured to obtain a load metric U according to a formula $$U = a_0 + b_0 \frac{\sum_{i=1}^{M}(B_i U_i)}{\sum_{i=1}^{M} B_i},$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

Optionally, in an embodiment, the processor 420 may be specifically configured to obtain a load metric U according to a formula $$U = a_0 + b_0 \sum_{i=1}^{M}(B_i U_i),$$

where $a_0$ is any number, $b_0$ is a non-zero number, $U_i$ is the $i^{th}$ piece of path load information of the M pieces of path load information, and $B_i$ is the $i^{th}$ load coefficient of the M load coefficients.

Optionally, $B_i$ may be a fixed value. For example, $B_i$ may be 1.

Optionally, in an embodiment, the transmitter 440 may be specifically configured to: periodically send the information about the load metric to the another adjacent node; or add the information about the load metric to a packet that is to be forwarded by the network node to the another adjacent node, and send, to the another adjacent node, the packet to which the information has been added; or send the information about the load metric to the another adjacent node when the load metric exceeds a load threshold.

It should be understood that the network node 400 in this embodiment of this application shown in FIG. 4 may be corresponding to the network node 300 shown in FIG. 3, and the foregoing and other operations and/or functions of units of the network node in this embodiment of this application are to implement a corresponding procedure of the method in FIG. 2. For brevity, details are not described herein again.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    obtaining, by a network node, M pieces of path load information, wherein an $i^{th}$ piece of path load information of the M pieces of path load information indicates total load of all shortest paths, passing through an $i^{th}$ adjacent node of the network node, among all shortest paths from the network node to a destination node, and $M \geq i \geq 1$;
    aggregating, by the network node into one load metric based on the M pieces of path load information, load of all shortest paths that are from the network node to the destination node and that pass through M adjacent nodes corresponding to the M pieces of path load information, wherein the load metric indicates total load of all the shortest paths from the network node to the destination node;
    sending, by the network node, information about the load metric to another adjacent node other than the M adjacent nodes of all adjacent nodes of the network node, wherein the sending includes periodically sending, by the network node, the information about the load metric to the another adjacent node;
    receiving, by the another adjacent node, the information about the load metric sent by the network node;
    updating, by the another adjacent node, the load metric information stored on the adjacent node based on the received information about the load metric; and
    selecting, by the another network node, a path based on the updated load metric information.

2. The method according to claim 1, wherein the aggregating, by the network node into one load metric based on the M pieces of path load information, load of all shortest paths that are from the network node to the destination node and that pass through M adjacent nodes corresponding to the M pieces of path load information comprises:
    aggregating, by the network node into one load metric based on the M pieces of path load information and M load coefficients, the load of all the shortest paths that are from the network node to the destination node and that pass through the M adjacent nodes, wherein an $i^{th}$ load coefficient of the M load coefficients is a total bandwidth of all interfaces that are used by the network node to send data to the $i^{th}$ adjacent node.

3. The method according to claim 2, wherein the aggregating, by the network node into one load metric based on the M pieces of path load information and M load coefficients, the load of all the shortest paths that are from the network node to the destination node and that pass through the M adjacent nodes comprises:
    obtaining, by the network node, a load metric U according to a formula $$U = a_0 + b_0 \frac{\sum_{i=1}^{M}(B_i U_i)}{\sum_{i=1}^{M} B_i},$$

wherein $a_0$ is any number, $b_0$ is a non-zero number, $U_i$ is the $i^{th}$ piece of path load information of the M pieces of path load information, and $B_i$ is the $i^{th}$ load coefficient of the M load coefficients.

4. The method according to claim 2, wherein the aggregating, by the network node into one load metric based on the M pieces of path load information and M load coefficients, the load of all the shortest paths that are from the network node to the destination node and that pass through the M adjacent nodes comprises:
    obtaining, by the network node, a load metric U according to a formula $$U = a_0 + b_0 \sum_{i=1}^{M}(B_i U_i),$$

wherein $a_0$ is any number, $b_0$ is a non-zero number, $U_i$ is the $i^{th}$ piece of path load information of the M pieces of path load information, and $B_i$ is the $i^{th}$ load coefficient of the M load coefficients.

5. The method according to claim 1, wherein the sending, by the network node, information about the load metric to another adjacent node other than the M adjacent nodes of all adjacent nodes of the network node comprises:
adding, by the network node, the information about the load metric to a packet that is to be forwarded by the network node to the another adjacent node, and sending, to the another adjacent node, the packet to which the information has been added; or
sending, by the network node, the information about the load metric to the another adjacent node when the load metric exceeds a load threshold.

6. An apparatus comprising:
a network node, comprising:
at least one processor; and
a non-transitory computer-readable storage medium coupled to the at least one processor and storing programming instructions for execution by the at least one processor, wherein the programming instructions instruct the at least one processor to:
obtain M pieces of path load information, wherein an $i^{th}$ piece of path load information of the M pieces of path load information indicates total load of all shortest paths, passing through an $i^{th}$ adjacent node of the network node, among all shortest paths from the network node to a destination node, and $M \geq i \geq 1$;
aggregate, into one load metric based on the M pieces of path load information, load of all shortest paths that are from the network node to the destination node and that pass through M adjacent nodes corresponding to the M pieces of path load information, wherein the load metric indicates total load of all the shortest paths from the network node to the destination node; and
send information about the load metric to another adjacent node other than the M adjacent nodes of all adjacent nodes of the network node; and
the apparatus further including the another adjacent node, the another adjacent node including at least one further processor, and a non-transitory computer-readable storage medium coupled to the at least one further processor and storing further programming instructions for execution by the at least one further processor, wherein the further programming instructions instruct the at least one further processor to:
receive the information about the load metric sent by the network node;
update the load metric information stored on the adjacent node based on the received information about the load metric; and
select a path based on the updated load metric information.

7. The apparatus according to claim 6, wherein the programming instructions instruct the at least one processor to aggregate, into one load metric based on the M pieces of path load information and M load coefficients, the load of all the shortest paths that are from the network node to the destination node and that pass through the M adjacent nodes, wherein an $i^{th}$ load coefficient of the M load coefficients is a total bandwidth of all interfaces that are used by the network node to send data to the $i^{th}$ adjacent node.

8. The apparatus according to claim 7, wherein the programming instructions instruct the at least one processor to obtain a load metric U according to a formula $$U = a_0 + b_0 \frac{\sum_{i=1}^{M}(B_i U_i)}{\sum_{i=1}^{M} B_i},$$

wherein $a_0$ is any number, $b_0$ is a non-zero number, $U_i$ is the $i^{th}$ piece of path load information of the M pieces of path load information, and $B_i$ is the $i^{th}$ load coefficient of the M load coefficients.

9. The apparatus according to claim 7, wherein programming instructions instruct the at least one processor to obtain a load metric U according to a formula $$U = a_0 + b_0 \sum_{i=1}^{M}(B_i U_i),$$

wherein $a_0$ is any number, $b_0$ is a non-zero number, $U_i$ is the $i^{th}$ piece of path load information of the M pieces of path load information, and $B_i$ is the $i^{th}$ load coefficient of the M load coefficients.

10. The apparatus according to claim 6, wherein the programming instructions instruct the at least one processor to:
add the information about the load metric to a packet that is to be forwarded by the network node to the another adjacent node, and send, to the another adjacent node, the packet to which the information has been added; or
send the information about the load metric to the another adjacent node when the load metric exceeds a load threshold.

* * * * *